(12) United States Patent
Mertens et al.

(10) Patent No.: US 8,070,456 B2
(45) Date of Patent: Dec. 6, 2011

(54) METHOD FOR PREVENTING POWER SURGE IN A COMPRESSOR SUPPLIED BY A POWER CONVERTER BY DIRECT TORQUE CONTROL

(75) Inventors: Axel Mertens, Wedemark (DE); Gerhard Neeser, Neunkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 1178 days.

(21) Appl. No.: 11/721,622

(22) PCT Filed: Dec. 5, 2005

(86) PCT No.: PCT/EP2005/056457
§ 371 (c)(1),
(2), (4) Date: Jun. 13, 2007

(87) PCT Pub. No.: WO2006/063947
PCT Pub. Date: Jun. 22, 2006

(65) Prior Publication Data
US 2009/0252617 A1  Oct. 8, 2009

(30) Foreign Application Priority Data
Dec. 14, 2004  (DE) .................... 10 2004 060 206

(51) Int. Cl.
*F04B 49/06* (2006.01)
(52) U.S. Cl. .............. 417/44.1; 417/53; 417/22
(58) Field of Classification Search ........... 417/42, 417/44.11, 22, 44.1, 53; 318/432, 433, 434; 700/28, 29, 30, 31, 80
See application file for complete search history.

(56) References Cited

U.S. PATENT DOCUMENTS

| | | | |
|---|---|---|---|
| 3,876,326 A | | 4/1975 | Weitz |
| 4,334,370 A | * | 6/1982 | Holzenberger ............... 37/195 |
| 4,659,976 A | * | 4/1987 | Johanson ..................... 388/816 |
| 4,810,943 A | * | 3/1989 | Kawaguchi et al. ......... 318/434 |
| 5,019,757 A | | 5/1991 | Beifus |
| 5,235,259 A | * | 8/1993 | Dhindsa et al. .............. 318/434 |
| 5,742,500 A | * | 4/1998 | Irvin ................................ 700/9 |
| 5,743,715 A | * | 4/1998 | Staroselsky et al. ............ 417/6 |
| 5,775,879 A | * | 7/1998 | Durando ........................ 417/45 |
| 5,894,736 A | | 4/1999 | Misawa et al. |
| 6,097,171 A | | 8/2000 | Branecky |
| 6,353,303 B1 | * | 3/2002 | Ramachandran et al. .... 318/727 |
| 6,462,494 B1 | * | 10/2002 | Schone et al. ................ 318/433 |
| 6,501,629 B1 | * | 12/2002 | Marriott ......................... 361/22 |
| 7,080,508 B2 | * | 7/2006 | Stavale et al. .................. 60/431 |
| 2002/0018721 A1 | * | 2/2002 | Kobayashi et al. ......... 417/44.1 |
| 2003/0057904 A1 | * | 3/2003 | Sacher .......................... 318/268 |

FOREIGN PATENT DOCUMENTS

| | | |
|---|---|---|
| EP | 0 175 445 B1 | 11/1990 |
| EP | 0 565 373 A2 | 10/1993 |
| EP | 0 676 545 A2 | 10/1995 |
| WO | WO 02074567 A2 * | 9/2002 |
| WO | WO 2004/013494 A1 | 2/2004 |

* cited by examiner

*Primary Examiner* — Devon C Kramer
*Assistant Examiner* — Nathan Zollinger
(74) *Attorney, Agent, or Firm* — Henry M. Feiereisen; Ursula B. Day

(57) ABSTRACT

A method for operation of a compressor supplied by a power converter having an operating condition ($B_V$) for the compressor (12) supplied by a power converter, generated from a measured actual rotational speed (n) of the compressor and a given effective current component ($i_W$) of a measured power converter output current (I) using a stored speed-dependent pump characteristic curve (SG) monitored for validity such that on determining invalidity, as per a stored speed-dependent instantaneous curve, a control signal ($S_{SG}$) for reducing a torque (M) is generated. A method for operation of a compressor supplied by a power converter is then achieved with which the duration and the intensity of surge conditions is significantly reduced.

10 Claims, 3 Drawing Sheets

METHOD FOR PREVENTING POWER SURGE IN A COMPRESSOR SUPPLIED BY A POWER CONVERTER BY DIRECT TORQUE CONTROL

BACKGROUND OF THE INVENTION

The invention relates to a method for operation of a compressor supplied by a power converter.

Under normal circumstances, the power consumption, torque and rotational speed of compressors, for example centrifugal compressors, turbocompressors, follow fixed proportionalities. The profile of these parameters can be described using families of characteristics. In particular, a diagram of pressure against volumetric flow is used to illustrate an operating state of the compressor. FIG. 1 illustrates such an H-Q diagram. Under normal conditions, the compressor is operated only in a permissible region of the family of characteristics. The region is permissible with the exception of the hatched region SB of this family of characteristics. The hatched region SB marks an impermissible region SB for the compressor which must be avoided without fail. If a compressor is operated in this impermissible region SB, this may result in the compressor being damaged or destroyed. Entry into this impermissible region SB is defined by a so-called pump limit characteristic curve SG which is also referred to as a surge limit. If a compressor enters this impermissible region SB for whatever reasons, the "pumping" fault, also referred to as surge, is present.

The "pumping" fault (surge) involves the pressure of the compressor exceeding a particular value that depends on the volumetric flow Q. That is to say, in the H-Q diagram shown in FIG. 1, the pump limit characteristic curve SG is crossed, with the result that the operating point of the compressor is in the hatched region SG in the event of a fault. Flow separation at the compressor blades results in the case of such a fault. The result is that the differential pressure H collapses, as a result of which part of the volumetric flow Q flows backward through the compressor. However, the reduction in the differential pressure H also means that the impermissible region SB for the compressor is left again. However, the same conditions as before the fault are thus attained and the process is repeated cyclically. The compressor pumps as a result of changing back and forth between the permissible region and the impermissible region. The result of this pumping is that the compressor blades begin to vibrate. This considerably increases the risk of a blade breaking. In addition, this pumping of the compressor results in great pressure fluctuations in the pipe system connected to the compressor. The surge limit SG which characterizes the limit characteristic curve of the permissible region is dependent on the gas density and, with a given compressor material, on the temperature of the gas.

In order to be able to determine this "pumping" fault, operating parameters such as pressure difference H, volumetric flow Q, gas density $G_D$ or gas temperature $G_T$ have hitherto been measured. These parameters are supplied to a compressor controller which uses them to determine an operating point in the H-Q diagram. A predetermined pump limit characteristic curve ("surge limit") is stored in this compressor controller. When this pump limit characteristic curve is approached in the case of compressors having a constant rotational speed, the differential pressure H is reduced using a mechanical actuator at the compressor inlet. Such a mechanical actuator is an inlet guide blade apparatus having an actuating time in the range of seconds. In the case of compressors having a variable rotational speed, the rotational speed is decreased.

One disadvantage of this previous method is that the "pumping" fault is detected only when flow separation has already started at the compressor blades. That is to say, damage to the blades has already begun. In the case of a multistage compressor, the entire volumetric flow Q and the entire differential pressure H first of all change only slightly, with the result that the state is detected only when it is highly pronounced. In the case of a single-stage compressor, the undesirable operating point occurs suddenly, with the result that conventional detection and control cannot react quickly enough. This results in the compressor having to be completely overhauled after a predetermined limited number of faults. Therefore, despite complicated metrology and control technology, it is only possible to determine that a "pumping" fault has occurred. Timely detection and a countermeasure resulting therefrom are not possible.

SUMMARY OF THE INVENTION

The invention is now based on the object of specifying a method for operation of a compressor supplied by a power converter, which method is used to considerably reduce the duration and intensity of surge states.

According to the invention, this object is achieved by a method for operation of a compressor supplied by a power converter, wherein an operating state of the compressor supplied by a power converter is formed from a measured actual rotational speed value of this compressor and a predetermined active current component of a measured power converter output current using a stored pump limit characteristic curve that depends on the rotational speed, being monitored for reliability in such a manner that, when unreliability is determined, a control signal for reducing a torque is generated in accordance with a stored torque characteristic curve that depends on the rotational speed.

As a result of the fact that signal variables of a driving power converter of the compressor and a stored pump limit characteristic curve are used to determine an actual operating state of the compressor, it is possible to very quickly determine whether there is an operating state which is in the impermissible region of the H-Q diagram. The speed of this method is determined by the system clock of the control system of the driving power converter. In addition, when an impermissible operating state is determined, a stored torque characteristic curve that depends on the rotational speed can be used to generate a control signal which is used to reduce a signal variable of this driving power converter, as a result of which this impermissible operating state is immediately left again.

In the driving power converter, the variables of rotational speed and torques of the drive, that is to say of the compressor in this case, are already available for conventional drive control systems. These variables are determined in a very accurate manner and in a fast sampling cycle of, for example, 1 msec. In the steady state of a compressor supplied by a power converter, the variable of the rotational speed of the driving power converter is proportional to the volumetric flow Q of the compressor and the variable of the torque of the driving power converter is proportional to the differential pressure of the compressor. An H-Q diagram of the compressor is thus proportional to an M-n diagram of the driving power converter. Since the torque M is proportional to the active current component of a power converter output current, the H-Q diagram of the compressor is also proportional to the $i_W$-n diagram of the driving power converter.

BRIEF DESCRIPTION OF THE DRAWING

The invention is now based on this proportionality. The method according to the invention uses the variables of torque and rotational speed of the driving power converter and uses them to determine a proportional operating state of the compressor. A stored pump limit characteristic curve is then used to determine whether said operating state is permissible or impermissible. In the case of an impermissible operating state, a stored predetermined torque characteristic curve that depends on the rotational speed is used to generate a control signal, thus causing this impermissible operating state to be left.

The use of already existing drive variables makes it possible to dispense with additional measuring devices. Since the clock frequency of the driving power converter is in the range of milliseconds and not in the range of seconds, an impermissible operating state of a compressor supplied by a power converter can be determined many times faster than before. In addition, a controlled variable can be generated on the basis of a stored torque characteristic curve that depends on the rotational speed, as a result of which this impermissible operating state which has been determined is left again. The control signal generated corresponds to a torque value of the stored torque characteristic curve that depends on the rotational speed, said torque value acting on a torque limitation of the driving power converter. This reduces the torque limit, with the result that the drive reduces its rotational speed by the lower permitted torque and the compressor leaves the impermissible region again. As a result, there is also no longer any need for an inlet guide blade apparatus. Since the system frequency of the driving power converter is in the range of milliseconds and not in the range of seconds, the fault determined can be combated much more quickly than before.

Figure 1:
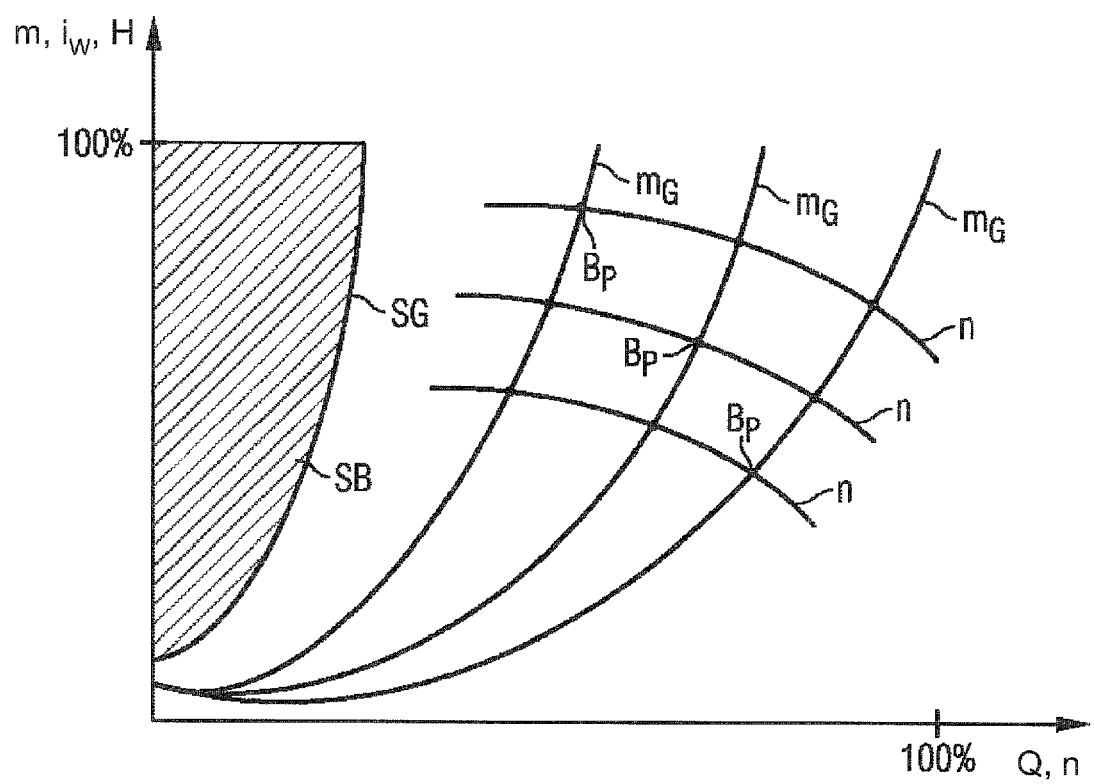

In one advantageous embodiment of the method according to the invention, the predetermined active current component of the measured power converter output current or a torque difference value that has been determined is monitored for dynamic change. If a respective predefined dynamic limit value is exceeded, there is an immediate fault. Occurrence of the surge state can thus be detected at a very early point in time.

It was mentioned at the outset that the surge limit is dependent on the gas density and, with a given compressor material, on the temperature of the gas. For this reason, in another advantageous embodiment of the method according to the invention, the stored torque characteristic curve that depends on the rotational speed is matched to the state of a medium to be compressed. The simplest embodiment is a set of pump limit characteristic curves which depend on the rotational speed and differ only in terms of the parameters of gas density and gas temperature. These two parameters can be used to select the appropriate pump limit characteristic curve from a set of pump limit characteristic curves that depend on the rotational speed.

If the torque characteristic curve that depends on the rotational speed preferably emulates the pump limit characteristic curve, entry into the impermissible region for the compressor supplied by a power converter will be avoided. In addition, the torque characteristic curve that depends on the rotational speed is likewise matched to the gas while matching the pump limit characteristic curve to the gas to be compressed.

In another advantageous embodiment of the method according to the invention, the reduction in the control signal is canceled after a predetermined period of time. This canceling of the control signal is used to detect whether the condition which led to the fault is still present. If the condition which triggered the fault is still present, an operating state in the impermissible region of the H-Q diagram is approached. According to the invention, this is detected and the countermeasure according to the invention is initiated.

In another embodiment of the method according to the invention, the predetermined period of time is shortened on the basis of the frequency with which the impermissible operating state which has been determined occurs. This extends the service life of the compressor.

In another embodiment of the method according to the invention, a warning signal is generated when an impermissible operating state of the compressor is determined. This warning signal can be acoustic and/or optical. The process controller can thus detect that the compressor has approached an impermissible surge state.

The rapid response of the method according to the invention considerably reduces both the duration and the intensity of surge states in comparison with conventional methods. On the one hand, this extends the service life of the compressor and, on the other hand, reduces the mechanical loading on the existing pipe system by avoiding pressure surges and vibrations.

In order to explain the invention further, reference is made to the drawing in which a plurality of embodiments of the apparatus for carrying out the method according to the invention are schematically illustrated.

Figure 2:
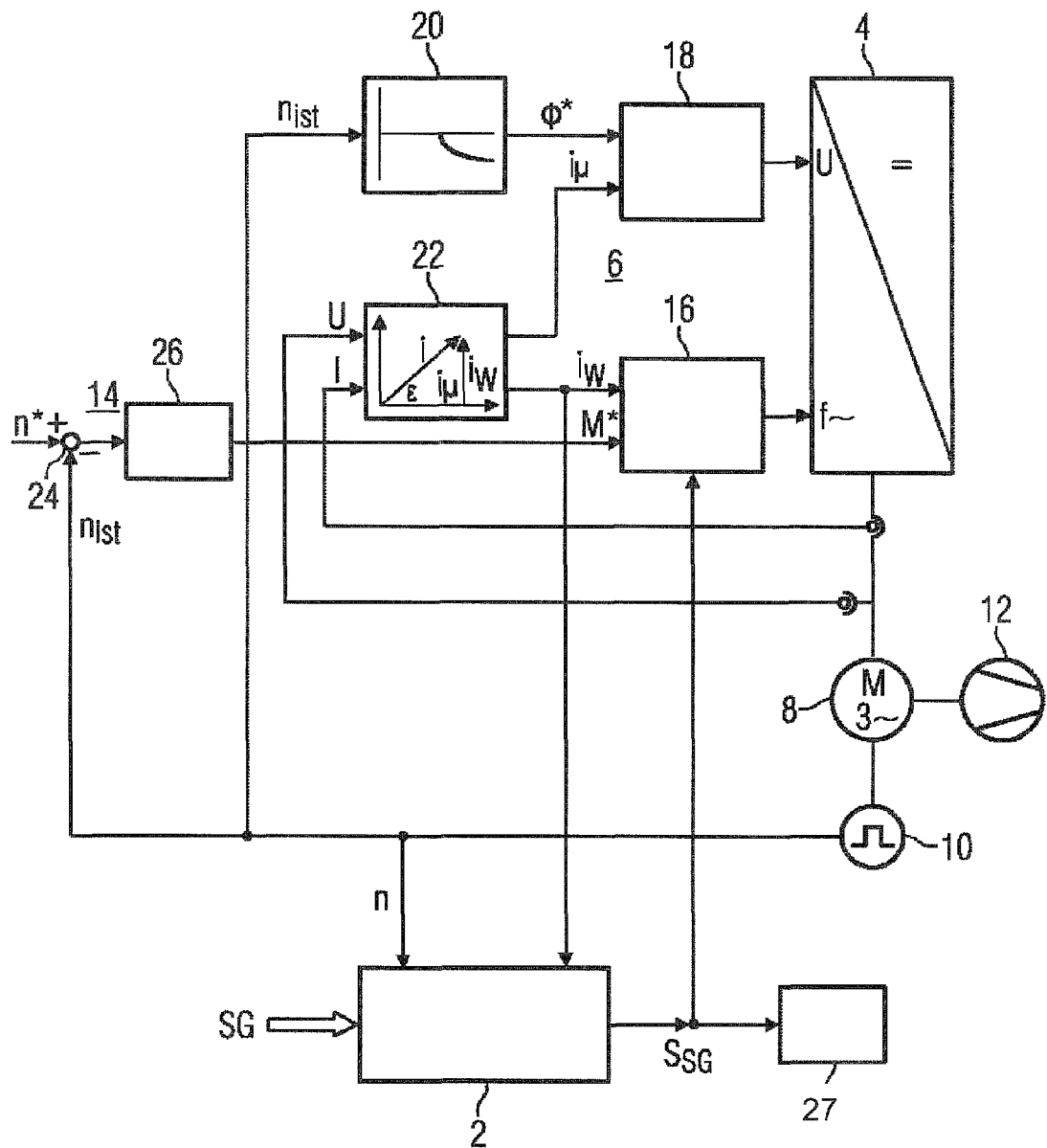

FIG. 1 shows an H-Q diagram of a compressor,

FIG. 2 shows a block diagram of a compressor which is supplied by a power converter and has an apparatus for carrying out the method according to the invention, FIGS. 3 to 7 respectively show an embodiment of the apparatus for carrying out the method according to the invention.

DETAILED DESCRIPTION OF PREFERRED EMBODIMENTS

The H-Q diagram for a compressor shown in FIG. 1 illustrates rotational speed characteristic curves n and characteristic curves for countertorque profiles $m_G$. Each point at which a characteristic curve $m_G$ for a countertorque profile and a rotational speed characteristic curve n intersect represents an operating point $B_P$ of a compressor supplied by a power converter. In addition, this H-Q diagram illustrates an impermissible region SB for a compressor supplied by a power converter, which region is separated from the permissible region by a so-called pump limit characteristic curve SG (also referred to as a surge limit SG). Under normal conditions, a compressor is operated only in the permissible region, the operating point $B_P$ being on a characteristic curve for a countertorque profile which is adjacent to the surge limit SG. The more a compressor is used, the closer the characteristic curve $m_G$ of the countertorque profile is to the surge limit SG. However, this surge limit SG is dependent on the gas density $G_D$ and, with a given compressor material, on the temperature T of the gas G to be compressed. This results in a fault, namely the "pumping" fault. In the event of this fault, the pressure exceeds a particular value which depends on the volumetric flow Q, that is to say the surge limit SG is exceeded. In this case, flow separation at the compressor blades results. The result is that the differential pressure H collapses, as a result of which part of the volumetric flow Q flows backward through the compressor. The reduction in the differential pressure H means that the impermissible region SB (also referred to as the surge region) is left again. However, the same conditions as at the beginning of the fault are thus attained and the described process is repeated cyclically. The compressor pumps as a result of this. The result is that the compressor blades begin to vibrate and high pressure fluctuations occur in the pipe system. As a result of the compressor blades vibrating, there is the risk of one or more blades breaking on account of material fatigue. On account of this risk, compressors are overhauled after a few "pumping" faults.

FIG. 2 illustrates a block diagram of a compressor which is supplied by a power converter and has an apparatus 2 for carrying out the method according to the invention. In this block diagram, 4 is used to denote a load-side power converter, 6 is used to denote a field-oriented control system, 8 is used to denote an electric motor, 10 is used to denote a device for detecting an actual rotational speed value n and 12 is used to denote a compressor. On the stator side, the electric motor 8 is connected to outputs of the load-side power converter 4 which is also referred to as an inverter. The compressor 12 and the device 10 for detecting an actual rotational speed value n are connected to the drive shaft of the electric motor 8. The load-side power converter 4 is part of a DC-link converter. On the DC voltage side, this load-side power converter 4 is connected to a DC-link to which the DC-voltage-side outputs of a mains-side power converter are also connected. For reasons of clarity, only the load-side power converter 4 of this DC-link converter is illustrated.

The field-oriented control system 6 has a rotational speed control circuit 14 with a subordinate torque control circuit 16, a flux control circuit 18, a flux desired value forming device 20 and a flux calculator 22. The rotational speed control circuit 14 has a comparator 24 and a rotational speed controller 26. The torque control circuit 16 likewise has a comparator and a controller, which are not illustrated in any more detail. The comparator 24 uses a predetermined desired rotational speed value n* and an actual rotational speed value n which has been determined to form a control difference which is controlled to zero using the downstream rotational speed controller 26. A desired torque value M* is present at the output of the rotational speed controller 26, said desired value being supplied to the torque control circuit 16. The flux calculator 22 calculates a torque-forming current component and a flux-forming current component $i_W$ and $i_\mu$ on the basis of a measured power converter output current I and a measured power converter output voltage U in conjunction with motor parameters. The torque-forming current component $i_W$ (also referred to as an active current component) is supplied to the torque control circuit 16. The flux-forming current component $i_\mu$ is supplied to the flux controller 18 whose second input is connected to an output of the flux desired value forming device 20, at the output of which a desired flux value $\phi^*$ is present. On the input side, this flux desired value forming device 20 is connected to the device 10 for detecting an actual rotational speed value n. This known field-oriented control system 6 generates an actuating voltage, in particular its components of magnitude U and frequency f which are supplied to the load-side power converter 4. These components U, f of the actuating voltage are used to generate control signals for the semiconductor switches of the inverter 4.

The apparatus for carrying out the method according to the invention processes the variables of rotational speed n and torque M or torque-forming current component $i_W$ of the drive, which comprises the inverter and electric motor 8, in accordance with the method according to the invention. The result is a control signal $S_{SG}$ which is supplied to the torque control circuit 16. This control signal $S_{SG}$ is also supplied to a device 27 for generating a warning signal. In addition to these variables of rotational speed n, torque M and torque-forming current component $i_W$ of the drive, the apparatus 2 is supplied with a pump limit characteristic curve (surge limit) SG and a torque characteristic curve that depends on the rotational speed. Embodiments of this apparatus 2 can be gathered from FIGS. 3 to 7.

Figure 3:
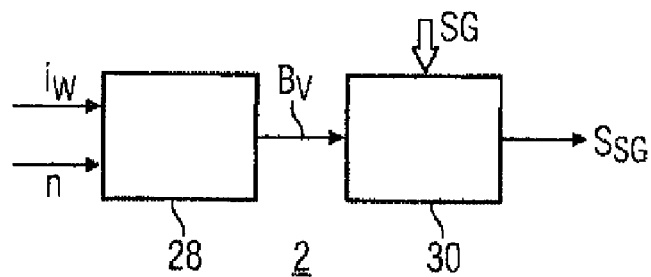

As shown in FIG. 3, FIG. 2 has, on the input side, an operating point forming device 28 which determines an operating point $B_V$ of the compressor 12 supplied by a power converter on the basis of the available variables of rotational speed n and torque-forming current component $i_W$ of the driving power converter and an H-Q diagram (FIG. 1). A downstream device 30 for checking permissibility then uses the stored surge limit SG to check whether the operating point $B_V$ of the compressor 12 supplied by a power converter is in the impermissible region SB. If so, a control signal $S_{SG}$ is present at the output of this device 30, which control signal was generated on the basis of the stored torque characteristic curve, which depends on the rotational speed, and is supplied to the torque controller 16 of the field-oriented control system 6 of the compressor 12 supplied by a power converter. This control signal $S_{SG}$ is used in the torque control circuit 16 to reduce the torque limit in such a manner that the drive reduces its rotational speed n by the lower permitted torque and the compressor 12 emerges from the impermissible region SB and does not enter it again.

Figure 4:
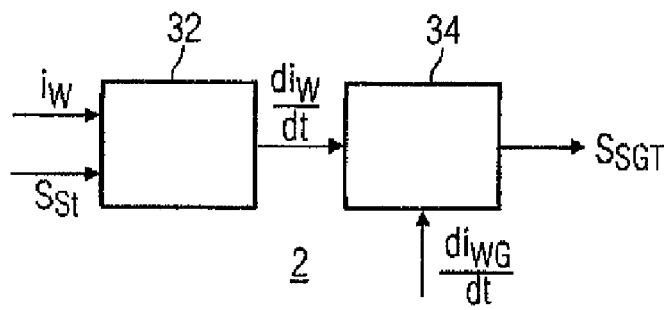

FIG. 4 illustrates another embodiment of the apparatus 2 shown in FIG. 2 in more detail. This embodiment has, on the input side, a device 32 for determining a rate of change d/dt of the torque-forming current component $i_W$ which has been determined and, on the output side, a comparator 34 whose input is connected to an output of the device 32. So that the current component $i_W$ formed can be used to determine its change over time, a start signal $S_{st}$ is used to start a predetermined time window. Once this time window has elapsed, an initial value and a final value are obtained. The difference between the final value and the initial value, based on the period of time determined by the time window, gives the instantaneous change $di_W/dt$ in the current component $i_W$. The dynamic change $di_W/dt$ in the current component $i_W$ is monitored using the downstream comparator 34 at whose second input a change limit value $di_{WG}/dt$ is present. If the limit value $di_{WG}/dt$ is exceeded, a trigger signal $S_{SGT}$ for generating a control signal $S_{SG}$ on the basis of the parameters of the instantaneous operating point $B_V$ and the stored torque characteristic curve that depends on the rotational speed is activated. This dynamic monitoring of the torque-forming current component $i_W$ provides an indication at a very early point in time that the surge limit SG is exceeded. The countermeasure can thus already be activated even before this surge limit SG is exceeded or upon exceeding this surge limit SG.

Figure 5:
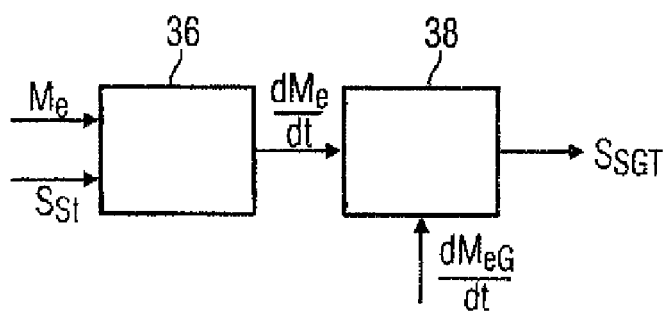

FIG. 5 illustrates another embodiment of the apparatus 2 shown in FIG. 2. In this embodiment, a desired/actual deviation $M_e$ of the torque M is dynamically monitored. That is to say this embodiment corresponds to the embodiment shown in FIG. 4, in which case a torque deviation $M_e$ is used instead of the torque-forming current component $i_W$ and a change limit value $dM_{eG}/dt$ for dynamically monitoring the torque deviation $M_e$ is used instead of the change limit value $di_{WG}/dt$ for dynamically monitoring the torque-forming current component $i_W$. This embodiment has, on the input side, a device 36 for determining a rate of change d/dt of the torque deviation $M_e$ and, on the output side, a comparator 38 whose input is connected to an output of the device 36. A trigger signal $S_{SGT}$ for triggering a generated control signal $S_{SG}$ is likewise present on the output side.

Figure 6:
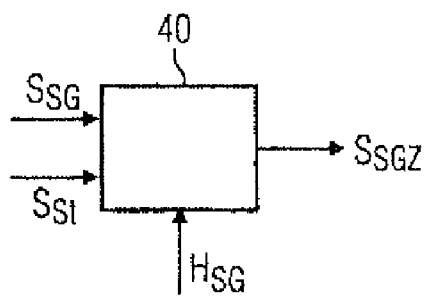

FIG. 6 illustrates an apparatus 40 for canceling the control signal $S_{SG}$. A generated control signal $S_{SG}$, on the one hand, and a start signal $S_{St}$, on the other hand, are supplied to this apparatus 40. Upon generating the control signal $S_{SG}$, the start signal $S_{St}$ is simultaneously activated and is used to start a time window. After the time window has elapsed, the control signal $S_{SGZ}$ present at the output is zero. Canceling the control signal $S_{SG}$ makes it possible to detect whether the conditions which led to the fault are still present. The point in time at which this canceling takes place can be advantageously adapted on the basis of the frequency with which the event occurs. Therefore, a so-called frequency signal $H_{SG}$ is supplied to the apparatus 40. That is to say, each time the event occurs again, the point in time at which the control signal $S_{SG}$ is canceled is shifted to a later point in time.

Figure 7:
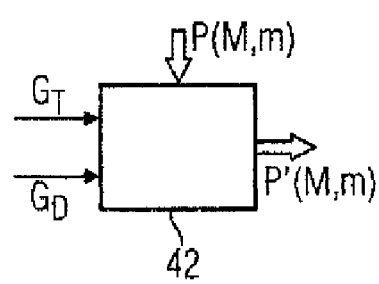

As already mentioned, the surge limit SG is dependent on the gas density $G_D$ and on the temperature T of the gas G to be compressed. This may result in the stored torque characteristic curve which depends on the rotational speed and acts on a torque limitation of the driving power converter coinciding with the surge limit SG or in the surge limit SG having moved in such a manner that the stored torque characteristic curve that depends on the rotational speed is in the impermissible region SB. In the event of a fault, the generated control signal $S_{SG}$ would thus no longer have an effect. The embodiment shown in FIG. 7 provides an apparatus 42 which is used to match the stored torque characteristic curve P(M,N), which depends on the rotational speed, to the gas density $G_D$ and the gas temperature $G_T$. A corrected torque characteristic curve P'(M,n) that depends on the rotational speed is then present at the output of this apparatus 42. The compressor 12 can thus now be operated closer to the actual surge limit SG, as a result of which more use can be made of this compressor 12. If the stored torque characteristic curve that depends on the rotational speed reflects a surge limit SG, entry into the surge region SB is avoided.

The rapid response of this method according to the invention considerably reduces both the duration and the intensity of surge states in comparison with conventional methods. On the one hand, this extends the service life of the compressor and, on the other hand, reduces the mechanical loading on the pipe system by avoiding pressure surges and vibrations.

What is claimed is:

1. A method for operating a compressor receiving electric power from a converter, comprising the steps of:
   storing a pump limit characteristic curve that depends on a rotation speed of the compressor,
   storing a torque characteristic curve that depends on the rotation speed of the compressor,
   measuring an actual rotational speed value of the compressor and an active current component of a measured power converter output current which together define an actual operating state of the compressor,
   comparing the actual operating state of the compressor with the pump limit characteristic curve, and
   generating, if the actual operating state of the compressor is outside an allowable operating range of the pump limit characteristic curve, a control signal for directly reducing the active current component to reduce a torque of the compressor in accordance with the stored rotation-speed-dependent torque characteristic curve.

2. The method of claim 1, further comprising the steps of:
   monitoring the active current component for dynamic changes in the active current over time, and
   reducing a limit value of the torque characteristic curve when a detected dynamic change in the active current exceeds a predetermined dynamic limit value.

3. The method of claim 1, further comprising the steps of:
   monitoring a torque difference value formed as a difference between a desired torque value, which is determined from a measured actual rotational speed value and a predetermined desired rotational speed value, and the active current component of the power converter output current for a dynamic change in the torque difference value, and
   reducing a limit value of the torque characteristic curve when a detected dynamic change in the torque difference value exceeds a predetermined dynamic limit value.

4. The method of claim 1, wherein the stored torque characteristic curve is adapted to a state of a medium to be compressed.

5. The method of claim 1, wherein the torque characteristic curve is a function of the pump limit characteristic curve.

6. The method of claim 1, further comprising the step of canceling the generated control signal after a predetermined period of time.

7. The method of claim 6, further comprising the steps of determining the frequency with which the actual operating state of the compressor is outside the allowable operating range, and
   extending the predetermined period of time based on the determined frequency.

8. The method of claim 1, further comprising the step of generating a warning message when the actual operating state of the compressor is outside the allowable operating range.

9. The method of claim 8, wherein the warning message is an acoustic alarm.

10. The method of claim 8, wherein the warning message is a visual alarm.

* * * * *